（12）United States Patent
Schluchter

(10) Patent No.: US 7,924,433 B2
(45) Date of Patent: Apr. 12, 2011

(54) DISPLACEMENT MEASUREMENT SYSTEM AND METHOD OF USE

(75) Inventor: William Clay Schluchter, Santa Clara, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 306 days.

(21) Appl. No.: 12/206,637

(22) Filed: Sep. 8, 2008

(65) Prior Publication Data

US 2010/0060899 A1 Mar. 11, 2010

(51) Int. Cl.
*G01B 11/02* (2006.01)
*G01B 9/02* (2006.01)
*G01D 5/36* (2006.01)

(52) U.S. Cl. ............... 356/499; 356/521; 250/237 G

(58) Field of Classification Search .............. 356/488, 356/494, 499, 521; 250/237 G
See application file for complete search history.

(56) References Cited

U.S. PATENT DOCUMENTS

| | | | |
|---|---|---|---|
| 4,772,119 A | 9/1988 | Bouwhuis et al. | |
| 4,815,850 A * | 3/1989 | Kanayama et al. | 356/488 |
| 4,979,826 A | 12/1990 | Ishizuka et al. | |
| 5,000,572 A * | 3/1991 | Nose et al. | 356/488 |
| 5,333,048 A * | 7/1994 | Michel et al. | 356/494 |
| 5,569,913 A * | 10/1996 | Ishizuka et al. | 250/237 G |
| 5,661,296 A | 8/1997 | Ishizuka et al. | |
| 5,696,373 A * | 12/1997 | Fukui et al. | 250/237 G |
| 5,696,374 A * | 12/1997 | Fukui et al. | 250/237 G |
| 6,005,667 A * | 12/1999 | Takamiya et al. | 356/499 |
| 6,429,940 B1 * | 8/2002 | Willhelm | 356/499 |
| 6,771,377 B2 * | 8/2004 | Jones et al. | 356/616 |
| 6,891,150 B2 * | 5/2005 | Takayama et al. | 250/231.13 |
| 2002/0000515 A1 * | 1/2002 | Takayama et al. | 250/231.16 |
| 2002/0085210 A1 * | 7/2002 | Takayama et al. | 356/499 |
| 2004/0090636 A1 * | 5/2004 | Holzapfel et al. | 356/499 |
| 2005/0162661 A1 * | 7/2005 | Yamamoto | 356/499 |
| 2007/0058173 A1 * | 3/2007 | Holzapfel | 356/499 |
| 2008/0304079 A1 | 12/2008 | Schluchter et al. | |

* cited by examiner

*Primary Examiner* — Patrick J Connolly

(57) ABSTRACT

A measurement displacement system and method are described. The measurement displacement system comprises a sensor head configured to transmit input optical beams and to receive measurement beams. The system comprises a transmission grating configured to diffract the input optical beams into sub-beams comprising more than one diffraction order. The transmission grating is adapted move in a direction. The measurement displacement system comprises a reflective element configured to diffract the sub-beams from the transmission grating and to return the sub-beams to the transmission grating. The reflective element is substantially stationary relative to the sensor head and the transmission grating selectively recombines the sub-beams to form the measurement beams and returns the measurement beams to the sensor head.

19 Claims, 8 Drawing Sheets

US 7,924,433 B2

DISPLACEMENT MEASUREMENT SYSTEM AND METHOD OF USE

CROSS-REFERENCE TO RELATED APPLICATIONS

The present application is related to U.S. patent application Ser. No. 12/172,810 to William Clay Schluchter, et al. and titled "Displacement Measurement Sensor Head and System having Measurement Sub-Beams Comprising Zeroth Order and First Order Diffraction Components" filed on Jul. 14, 2008. The entire disclosure of the parent application is specifically incorporated herein by reference.

BACKGROUND

Use of laser interferometry is known for precise measurement of small displacements and rotations using a beam of light split into reference and measurement beams. The measurement beam is reflected from a mirror mounted on a movable object and is combined with the reference beam reflected from a stationary object to generate a phase difference. The phase difference is proportional to the amount of displacement made between the reflector of the reference beam and the reflector of the measurement beam.

In many applications, the measurement beam path passes through air. In some applications, a double pass beam path can permit cancellation of propagation angles between the measurement beam path and the reference beam path. The double pass beam path increases the beam path length. Furthermore, the optical path length of the light can be more than four times the stroke of the moving object. In wafer exposure tools used in integrated circuit lithography, the optical path length can approach two meters. The long beam path presents a challenge for the measurement because the air through which the light travels must be well controlled in terms of temperature, pressure and gas composition. Because temperature, pressure and gas composition all affect a refractive index of air, a change or inconsistency in any of them presents as a phase shift and therefore a measurement error or measurement uncertainty. In many applications, the control of the index of refraction of air is becoming a performance limiting factor.

Among other considerations, it is desirable to reduce a path length of light travel in interferometry displacement measurement applications.

BRIEF DESCRIPTION OF THE DRAWINGS

An understanding of the present teachings can be gained from the following detailed description taken in conjunction with the accompanying drawings. The features are not necessarily drawn to scale. Wherever practical, like reference numerals refer to like features.

DETAILED DESCRIPTION

In the following detailed description, for purposes of explanation and not limitation, representative embodiments disclosing specific details are set forth in order to provide an understanding of embodiments according to the present teachings. However, it will be apparent that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the present teachings.

The representative embodiments are described in conjunction with a photolithography system used in semiconductor processing. Applicants emphasize that the present teachings have other applications where precise displacement measurements are desired, if not required. Notably, application of the present teachings is contemplated to other lithography systems (e.g., flat panel display lithography or integrated optical device lithography); methods, apparatuses and systems for the production of lithographic masks or reticles; methods apparatuses and systems that measure feature dimensions or feature placement in semiconductor, flat panel display or integrated optical device manufacture, and systems that inspect semiconductor devices, flat panel displays, or integrated optical devices. Again, it is emphasized that these are merely illustrative applications and are not intended to be limiting. Other applications of the present teachings and equivalents thereof are contemplated.

Figure 1:
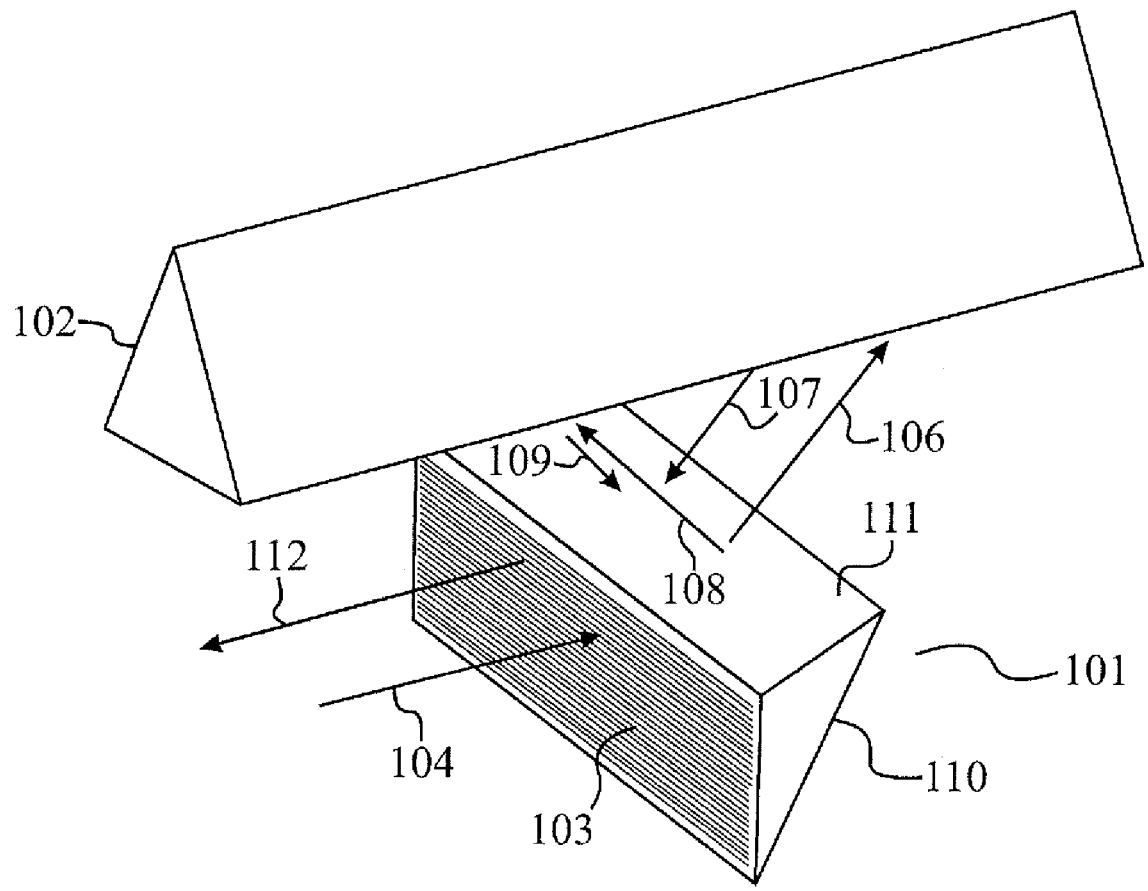
FIG. 1 shows a roof reflector and a transmission grating in accordance with a representative embodiment.

FIG. 1 shows a stage prism 101 and a roof reflector 102 in accordance with a representative embodiment. As described more fully herein, the stage prism 101 may be attached to a moving stage, and the roof reflector 102 is attached to a frame and remains substantially stationary during a measurement. Moreover, the roof reflector 102 may be another type of reflective element configured to selectively reflect and diffract optical beams and sub-beams. The stage prism 101 comprises a substantially uniform diffraction grating 103 disposed on or over a surface of the stage prism 101. Similarly, the roof reflector comprises a substantially uniform diffraction grating (not shown in FIG. 1). The grating 103 diffracts an input optical beam 104 into a positive first order diffraction (+1) and a negative first order diffraction (−1), which cause the input optical beam to split into sub-beams having different optical paths. Notably, the sub-beams are characterized herein by the order of the diffractions to which they are subjected. For example, a sub-beam that diffracts in the zeroth order (i.e., specular reflection) by both the diffraction grating 103 of the stage prism 101 and the diffraction grating of the roof reflector 102 is characterized as a (0)

sub-beam. Similarly, a sub-beam that has twice been subject to a first-order diffraction is characterized as a (+1) sub-beam or a (−1) sub-beam.

The sub-beams are subjected to specular reflection at a surface 110 and are refracted at surface 111, emerging as first sub-beam (+1) 106 and second sub-beam 108 (−1) and directed toward the roof reflector 102. The sub-beams 106, 108 are incident on a surface of the roof reflector 102 opposing surface 111, and are subjected to diffraction of their respective orders. As described in greater detail below, the sub-beams are each subjected twice to specular reflection, and emerge from the roof reflector as first sub-beam 107 and second sub-beam 109, and are nominally oriented antiparallel to first sub-beam 106 and second sub-beam 108, respectively, for a nominal stage prism orientation with respect to roof reflector 102. The term "antiparallel" as used herein refers to the condition of light beams being parallel and propagating in opposite directions. The sub-beams 107, 109 are combined by the transmission grating 103 and emerge as a first measurement beam 112 used for quadrature detection in a displacement measurement system.

Figure 2:
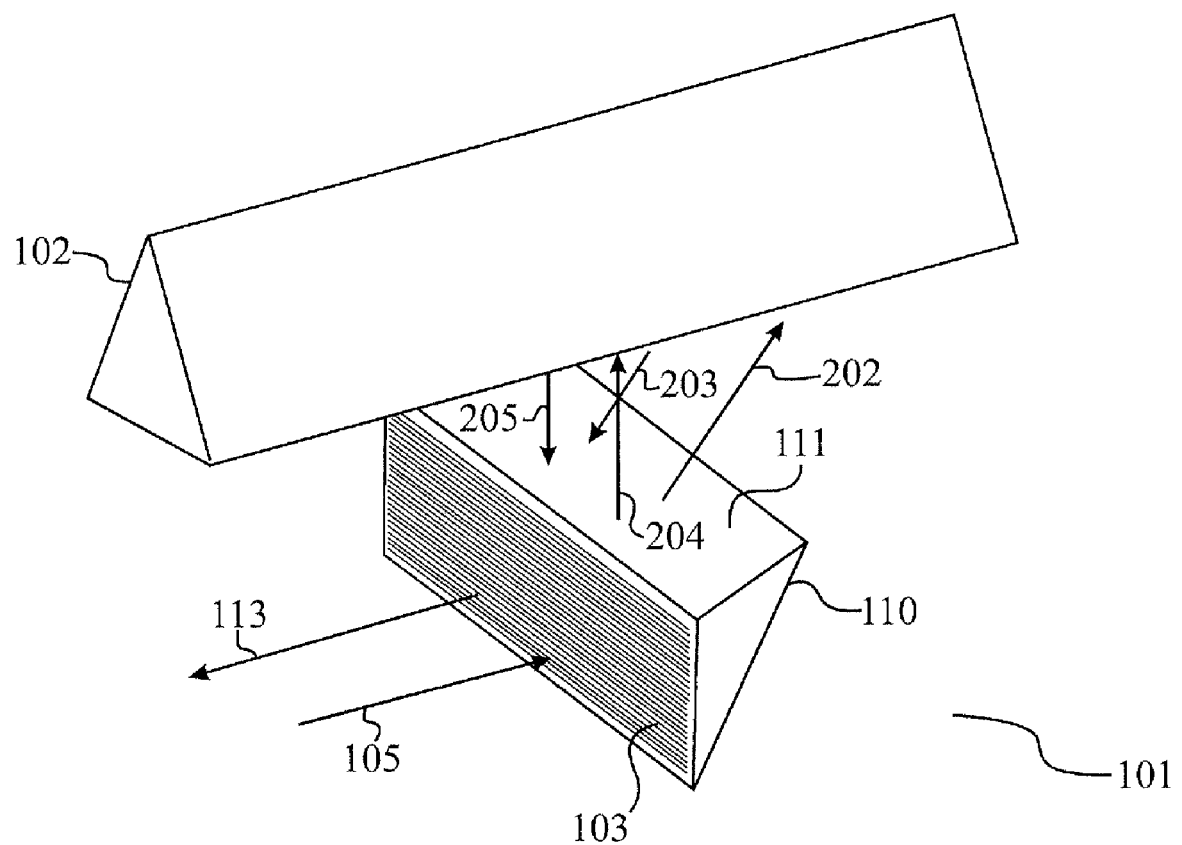
FIG. 2 shows a roof reflector and a transmission grating in accordance with a representative embodiment.

FIG. 2 shows the stage prism 101 and the roof reflector 102 in accordance with a representative embodiment useful in garnering a second measurement beam for quadrature detection. As described above, the stage prism 101 is attached to a moving stage, and the roof reflector 102 may be attached to a frame and remains substantially stationary during a measurement. The grating 103 subjects an input optical beam 105 to a positive first order diffraction (+1) and a zeroth order (0) diffraction, which cause the input optical beam to split into sub-beams having different optical pats. The sub-beams are subjected to specular reflection at a surface 110 and are refracted at surface 111, emerging as first sub-beam (+1 sub-beam) 202 and second sub-beam 204 (0 sub-beam) and directed toward the roof reflector 102. The sub-beams 202, 204 are incident on the surface of the roof reflector 102 opposing surface 111, and are subjected to diffraction of their respective orders. As described in greater detail below, the sub-beams are each subjected twice to specular reflection, and emerge from the roof reflector as first sub-beam 203 and second sub-beam 205, and are nominally oriented antiparallel to first sub-beam 202 and second sub-beam 204, respectively, for nominal stage prism orientation with respect to roof reflector 102. The sub-beams 203, 205 are combined by the transmission grating 103 and emerge as a second measurement beam used for quadrature detection in a displacement measurement system.

Figure 3A:
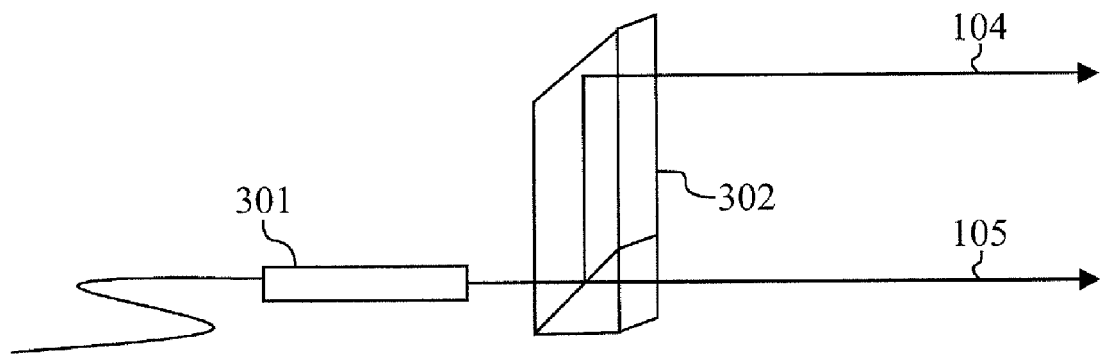
FIG. 3A shows transmitter assembly of a sensor head of a measurement system configured to transmit input optical beams in accordance with a representative embodiment.
Figure 3B:
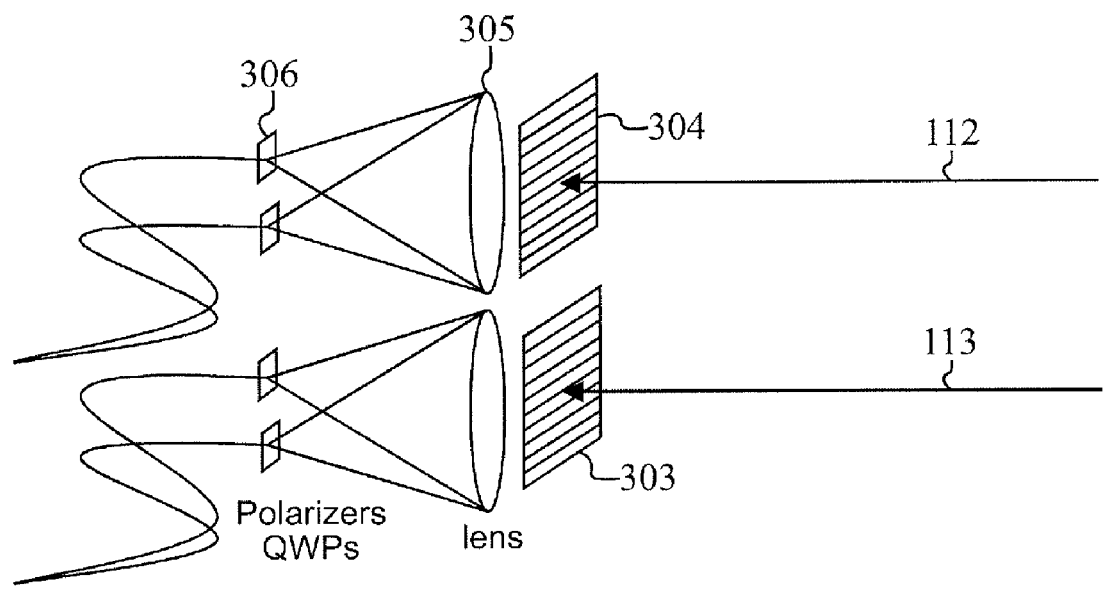
FIG. 3B shows a detector assembly of a sensor head of a measurement system configured to receive measurement beams in accordance with a representative embodiment.

FIGS. 3A and 3B show a transmitter assembly and a detector assembly of a sensor head of a displacement measurement system in accordance with a representative embodiment. The transmitter assembly comprises a collimator 301 and an optical element 302 configured to split an optical beam into two parallel input optical beams 104, 105. In an illustrative embodiment, the optical element comprises a splitting rhomboid, although other beamsplitters are contemplated. As described above, the input beams 104, 105 return in the form of first and second measurement beams 112, 113. The first and second measurement beams are incident on gratings 304 and 305, respectively, which split the first and second measurement beams providing two signals for each measurement beam. Lenses 305 focus light on quarter-wave retarders and polarizers 306 for detection of the phase difference between the sub-beams in each measurement beam. Notably, the capture and detection of the quadrature measurement signals is described in the cross-referenced patent application to Schlucter, et al. and is not repeated to avoid obscuring the description of the representative embodiments.

Figure 4:
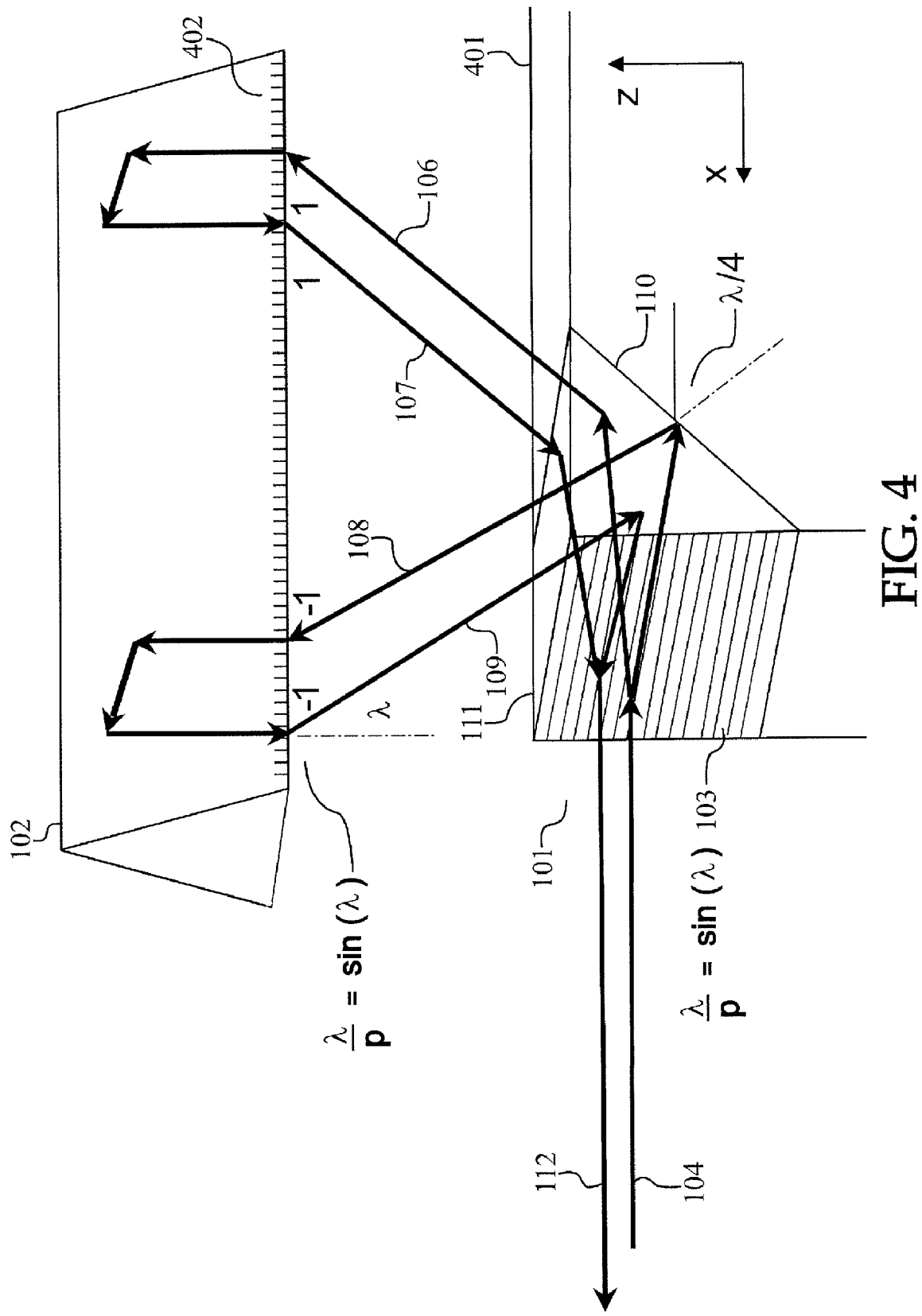
FIG. 4 shows a perspective view of the optical paths of sub-beams traversing a displacement measurement system in accordance with a representative embodiment.

FIG. 4 shows a perspective view of the optical paths of sub-beams traversing a displacement measurement system in accordance with a representative embodiment. As will become clearer as the present description continues, the sub-beams described in connection with FIG. 4 provide one measurement beam required for detection of one stage motion degree of freedom. The input optical beam 104 is incident on the grating 103, which is disposed over a (movable) stage 401, and is subject to diffraction (+1, −1), and thus the beam is split into first and second sub-beams 106, 108. The first sub-beam (+1) 106 and second sub-beam 108 (−1) are incident at different points on the surface 110 of the stage prism 101 due to their different trajectories due to different angles of diffraction. The sub-beams 106, 108 are reflected at interface 110 and are refracted at the interface 111 of the stage prism 101.

Sub-beam 106 is incident on a substantially uniform grating 402 of the roof reflector and is subjected to a first order diffraction (+1), emerging from the grating 402 nominally parallel to the z-direction of the coordinate system shown for nominal stage prism orientation with respect to roof reflector. The sub-beam 106 is reflected from the opposing interior surfaces of the roof reflector, and due to the geometry of the roof reflector (i.e., isosceles right triangle in cross-section), is incident on the grating 402 with the nominally antiparallel and offset orientation as shown for nominal stage prism orientation with respect to roof reflector 102. The first sub-beam 106 is again subjected to a first order diffraction and emerges as first sub-beam 107 along a trajectory that is nominally antiparallel to the trajectory of sub-beam 106 for nominal stage prism orientation with respect to roof reflector 102. The first sub-beam 107 is incident on the surface 111, is reflected by the surface 110 is diffracted by the grating 103 and emerges parallel and co-bore with sub-beam 109 as first measurement beam 112.

Second sub-beam 108 is incident on the surface 111 and is refracted toward the roof reflector 102 as shown. The second sub-beam 108 is incident on the grating 402 is subjected to a first order (−1) diffraction, and emerges from the grating 402 nominally parallel to the z-direction for nominal stage prism orientation with respect to roof reflector. The sub-beam 108 is reflected from the opposing interior surfaces of the roof reflector, and due to the geometry of the roof reflector 102 (i.e., isosceles right triangle in cross-section), is incident on the grating 402 nominally antiparallel and offset orientation as shown for nominal stage prism orientation with respect to roof reflector. The sub-beam 108 is again subjected to a first order diffraction and emerges as second sub-beam 109 along a trajectory that is nominally antiparallel to the trajectory of sub-beam 108 for nominal stage prism orientation with respect to roof reflector. The second sub-beam 109 is incident on the surface 111, is reflected by the surface 110 is diffracted by the grating 103, and emerges parallel and co-bore with sub-beam 107 as first measurement beam 112.

It can be shown that the change in the optical path length (OPL) for the (+1) sub-beam and the (−1) sub-beam due to motion in the z-direction is the same. The change in the OPL of sub-beams 106-108 due to motion in the ±z direction is identical, so that motion in the ±z direction does not contribute to a phase change difference in quadrature detection. As such, and as described more fully below, the first measurement beam 112 provides only phase change due to grating phase caused by motion in the x-direction.

Figure 5:
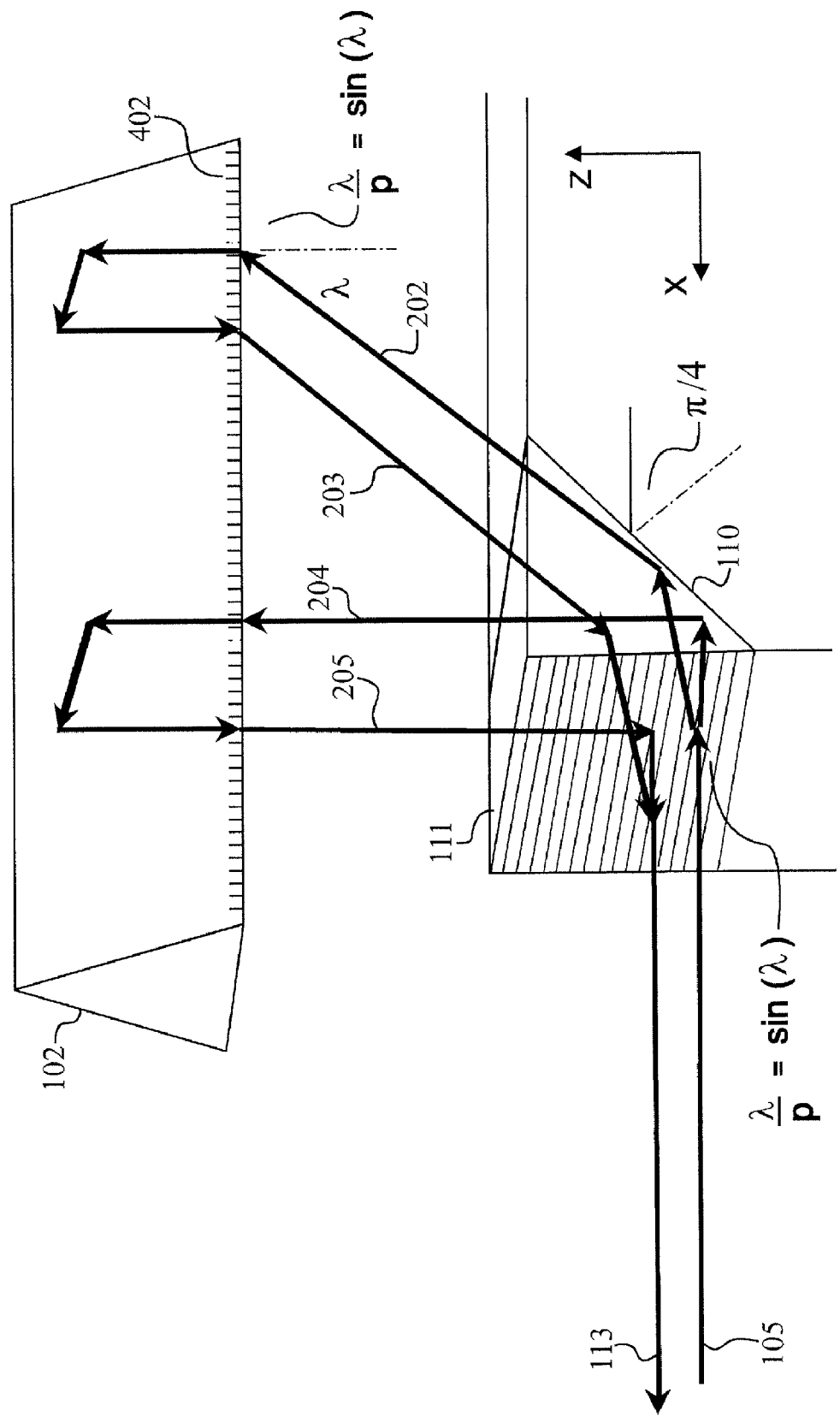
FIG. 5 shows a perspective view of the optical paths of sub-beams traversing a displacement measurement system in accordance with a representative embodiment.

FIG. 5 shows a perspective view of the optical paths of sub-beams traversing a displacement measurement system in accordance with a representative embodiment. As will become clearer as the present description continues, the sub-beams described in connection with FIG. 5 provide another measurement beam required for detection of one stage motion degree of freedom. The input optical beam 105 is incident on the grating 103 and is subject to diffraction (0, +1), and thus the beam is split into first and second sub-beams 202, 204. The first sub-beam (+1) 202 and second sub-beam 204 (0) are incident at different points on the surface 110 of the stage prism 101 due to their different trajectories (different angles of diffraction). Notably, the first order sub-beam may be garnered from a (+1) sub-beam, which emerges from the grating 103. In such an embodiment, the zeroth order sub-beam would follow a different trajectory shown in FIG. 5. The sub-beams 202, 204 are reflected at interface 110 and are refracted at the surface 111 of the stage prism 101.

The first sub-beam 202 is incident on the grating 402 at and is subjected to a first order diffraction (+1) emerging from the grating nominally parallel to the z-direction for nominal stage prism orientation with respect to roof reflector 102. The sub-beam 202 is reflected from the opposing interior surfaces of the roof reflector, and due to the geometry of the roof reflector (i.e., isosceles right triangle in cross-section), is incident on the grating 402 with the nominally antiparallel and offset orientation as shown for nominal stage prism orientation with respect to roof reflector. The first sub-beam 202 is again subjected to a first order diffraction and emerges as first sub-beam 203 along a trajectory that is nominally antiparallel to and offset from the trajectory of sub-beam 202 for nominal stage prism orientation with respect to roof reflector 102. The first sub-beam 203 is incident on the surface 111, is reflected by the surface 110, is diffracted by the grating 103 and emerges parallel and co-bore with sub-beam 205 as second measurement channel 113.

The second sub-beam 204 is incident on the grating 402 at and is subjected to a zeroth order diffraction (0) emerging from the grating nominally parallel to the z-direction for nominal stage prism orientation with respect to roof reflector. The sub-beam 204 is reflected from the opposing interior surfaces of the roof reflector, and due to the geometry of the roof reflector (i.e., isosceles right triangle in cross-section), is incident on the grating 402 with the nominally antiparallel and offset orientation as shown for nominal stage prism orientation with respect to roof reflector. The second sub-beam 204 is again subjected to a zeroth order diffraction and emerges as second sub-beam 205 along a trajectory that is nominally antiparallel to and offset from the trajectory of sub-beam 204 for nominal stage prism orientation with respect to roof reflector 102. The second sub-beam 205 is incident on the surface 111, is reflected by the surface 110 is diffracted by the grating 103 and emerges parallel and co-bore with sub-beam 203 as second measurement channel 113.

Figure 6:
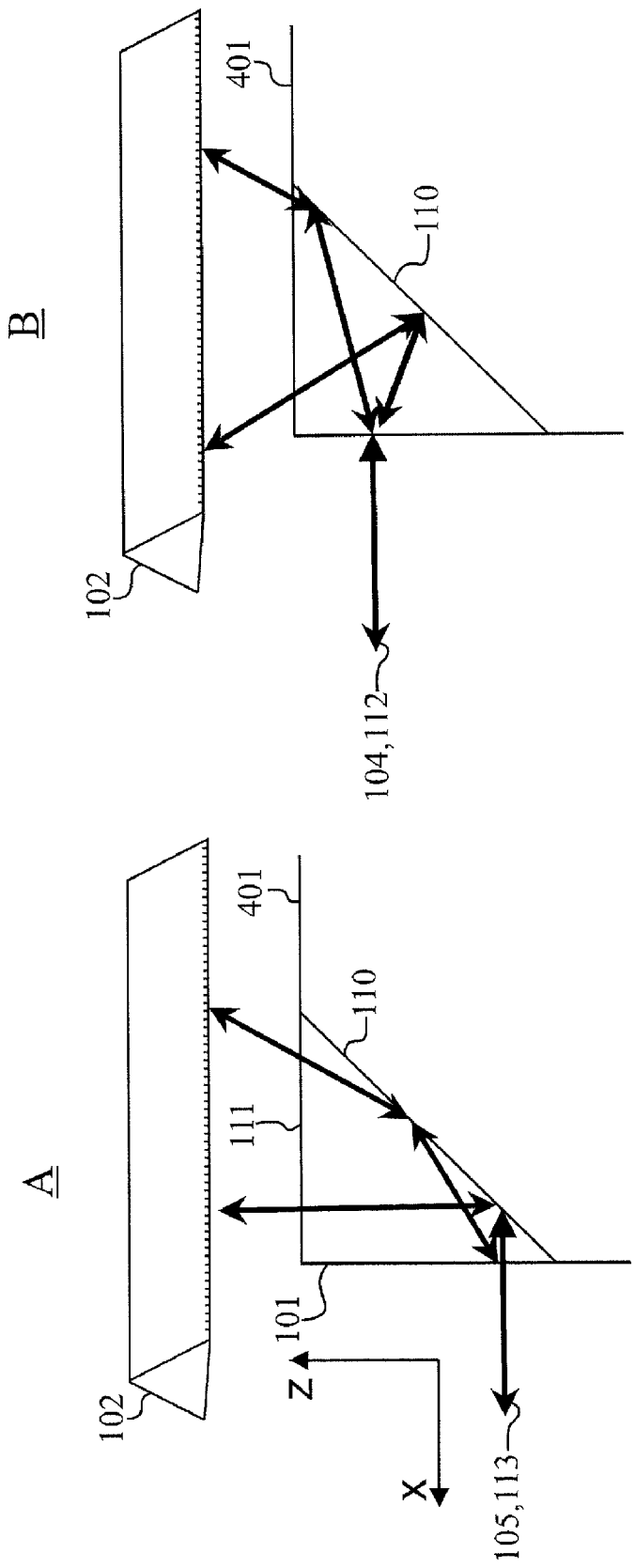
FIG. 6 shows the optical beam paths of the first and second beams and the resultant equations of motion for x displacement and z displacement.

FIG. 6 shows the optical beam paths of the first and second measurement beams and the resultant equations of motion for x displacement and z displacement. In 'A' diffraction of the input optical beam 105 provides 0,+1 sub-beams; and in 'B' or diffraction of the input optical beam 104 provides −1, +1 sub-beams. As noted above, the symmetric case, comprising −1, +1 order diffraction yields no net phase change due to OPL changes caused by z-motion. Only motion in x, which can induce grating phase change, results in a net phase change at the detector.

However, when sub-beams comprise both $0^{th}$ order diffraction components and first order diffraction components, the movement of the stage 401 in the x-direction or in the z direction causes a phase difference that contributes to a phase change difference in quadrature detection. Thus, second measurement beam 113 provides measure of both x and z displacement of the stage 401. For a given sub-beam (m) where m=−1, 0, or +1 the optical path length is $$\frac{2z}{\sqrt{1 - \left(\frac{m\lambda}{p}\right)^2}} \frac{1}{p\sin(\alpha)} \quad \text{(Eqn. 1)}$$

There are no path length changes in the sub beams for stage motion in the x direction. The grating phase induced by sub beams moving across the face of a grating is $$\frac{2mx}{p} \quad \text{(Eqn. 2)}$$

Grating phase induced by stage motion in the z direction is cancelled within each sub beam. That is to say that grating phase induced at the transmission grating 103 on the stage prism 101 is cancelled by the grating phase induced by the diffraction grating 402 on the roof reflector 102.

As shown by the equation in FIG. 6, the number of fringes N1 of first measurement beam 112 is the phase difference between sub beam (m=+1) and sub beam (m=−1) and given by:

$$N1 = \frac{4x}{p} \quad \text{(Eqn. 3)}$$

Similarly, it can be shown that the number of fringes N2 of the second measurement beam is the phase difference between sub beam (m=+1) and sub beam (m=0) and given by:

$$N2 = \frac{2x}{p} + \frac{2z(\sec(\alpha) - 1)}{p\sin(\alpha)} \quad \text{(Eqn. 4)}$$

where p is the pitch of grating 103; x is the displacement in the x-direction of the stage 401, z is the displacement of the stage 401; and $\alpha$ is given by:

$$\alpha = \sin^{-1}(\lambda/p) \quad \text{(Eqn. 5)}$$

and represents the angle of incidence of light at the grating 402.

Solving for x and z provides the equations of motion for a non-rotating stage in accordance with a representative embodiment:

$$x = \frac{N1p}{4} \quad \text{(Eqn. 6)}$$

$$z = \frac{1}{4}(2N2 - N1)p\cos(\alpha)\cot\left(\frac{\alpha}{2}\right) \quad \text{(Eqn. 7)}$$

Figure 7:
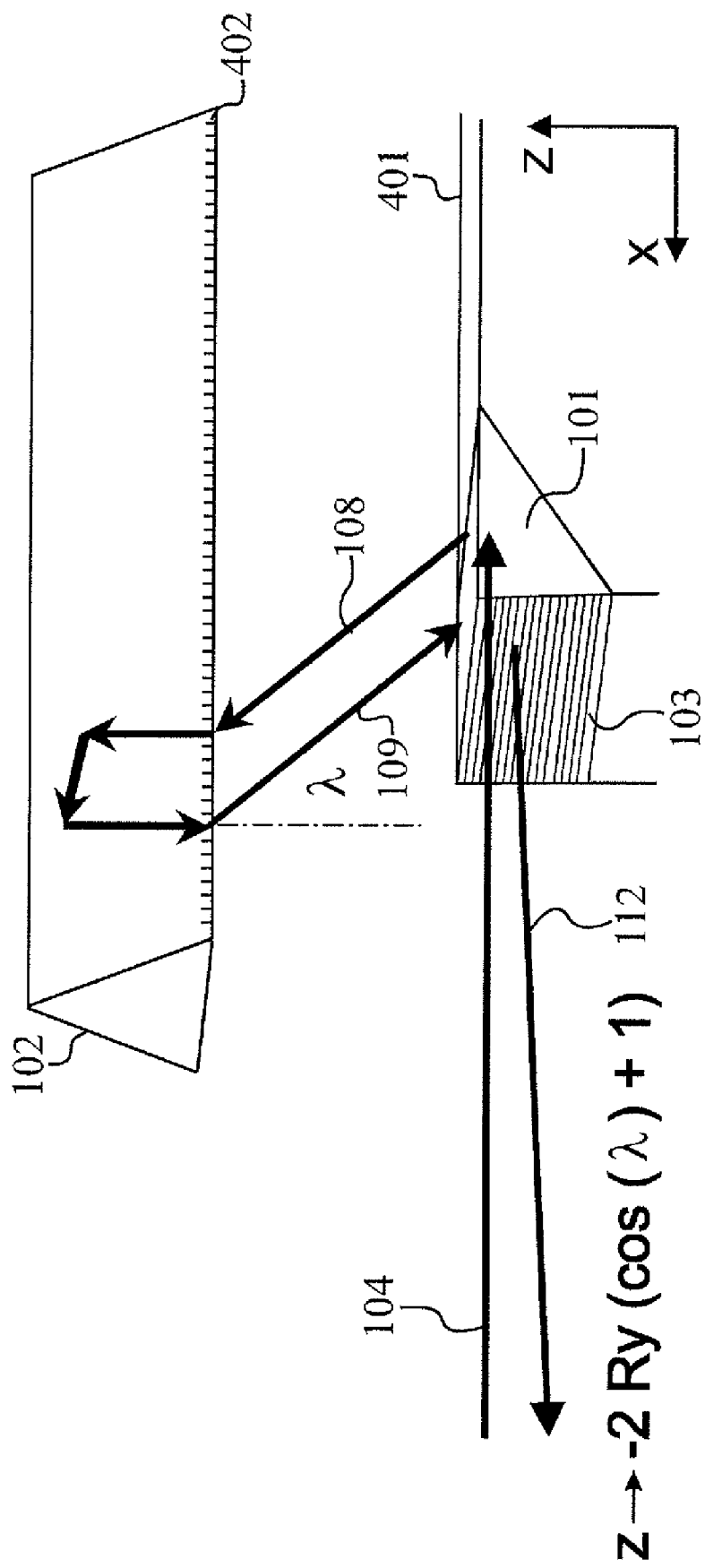
FIG. 7 shows a perspective view of the optical paths of measurement sub-beams of a measurement beam traversing a displacement measurement system in accordance with a representative embodiment.

FIG. 7 shows a perspective view of the optical paths of measurement sub-beams of a measurement beam traversing a displacement measurement system in accordance with a representative embodiment. As the stage 401 rotates for optimal lithography performance, the sub beams will deviate from the nominal paths described above in connection with representative embodiments. For short separations between stage prism 101 and roof reflector 102, this will produce small offsets in the combined beams 112 and 113 between the constituent sub beams. The parallelism of the constituent sub-beams is maximized for the combined beam 112 because x motion of the stage demands the highest requirement for precision. Tracing an arbitrary sub-beam (e.g., 106-109) through the stage prism 101 to the roof reflector 102, and back through the stage prism 102, the expression for the z direction cosine of the return sub-beam (e.g., 107, 109):

$$z \rightarrow -2 R_y (\cos(\alpha)+1) \quad \text{(Eqn. 8)}$$

where Ry is the small angle of stage rotation about the y axis in the coordinate system shown in FIG. 7. The expression for the y direction cosine of the return ray is zero for all sub beams. As such, sub-beams (−1,+1) will have an equal z direction cosine and will be parallel to each other, if not parallel to the x axis. This is important to the precision of the N1 measurement as well as improving the range of allowed stage rotation about the y axis. The N2 measurement will suffer slightly from nonparallel constituent sub beams but the effect is tolerable for many applications. The non parallelism between constituent sub beams (0,+1) in the N2 channel is:

$$2 R_y (1-\cos(\alpha)) \quad \text{(Eqn. 9)}$$

Figure 8:
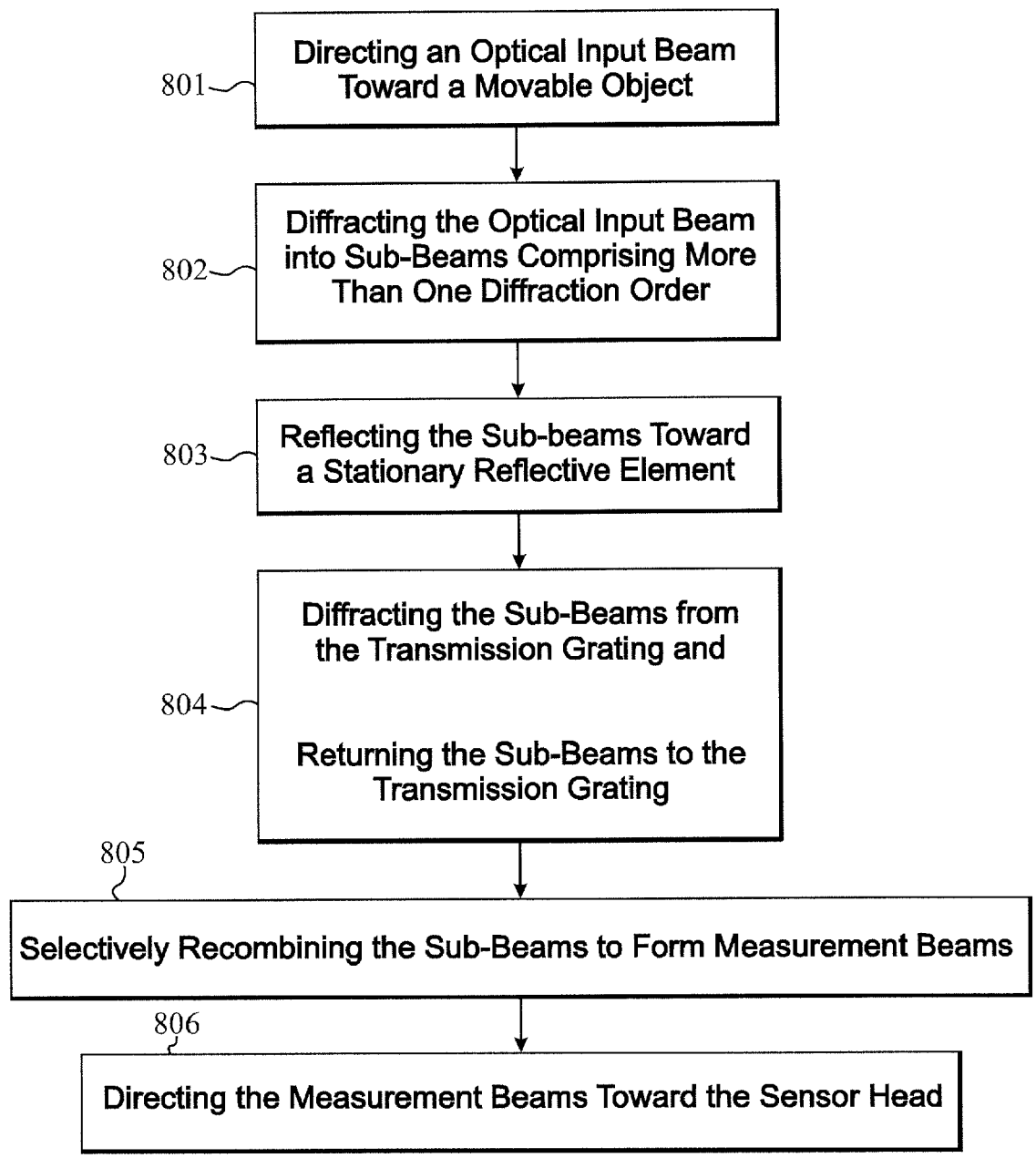
FIG. 8 is a flow-chart of a method of measuring a displacement in accordance with a representative embodiment.

FIG. 8 is a flow-chart of a method of measuring a displacement in accordance with a representative embodiment. The method is illustratively implemented using the system described in conjunction with representative embodiments above. At 801 the method comprises directing an optical input beam toward a movable object. At 802, the method comprises, at the movable object: diffracting the optical input beam into sub-beams comprising more than one diffraction order. At 803, the method comprises reflecting the sub-beams toward a stationary reflective element. At 804, the method comprises, at the reflective element: diffracting the sub-beams from the transmission grating, and returning the sub-beams to the movable object. At 805, the method comprises, at the movable object selectively recombining the sub-beams to form measurement channels. At 806, the method comprises directing the measurement beams toward a sensor head.

The method comprises directing an optical input beam toward a moving transmission grating. At 802, the method comprises diffracting the optical input beam into sub-beams comprising more than one diffraction order. At 803, the method comprises directing the sub-beams toward a reflector, wherein the reflector is substantially stationary. At 804, the method comprises diffracting the sub-beams from the transmission grating and returning the sub-beams to the transmission grating. At 805, the method comprises selectively recombining the sub-beams to form measurement beams. At 807, the method comprises directing the measurement beams toward the sensor head.

In view of this disclosure it is noted that variations to the displacement measurement sensor head, system and method of use described herein can be implemented in keeping with the present teachings. Further, the various devices, components, materials, structures and parameters are included by way of illustration and example only and not in any limiting sense. In view of this disclosure, those skilled in the art can implement the present teachings in determining their own applications and needed components, materials, structures and equipment to implement these applications, while remaining within the scope of the appended claims.

I claim:

1. A measurement displacement system, comprising:
    a sensor head configured to transmit input optical beams and to receive measurement beams;
    a transmission grating configured to diffract the input optical beams into sub-beams comprising more than one diffraction order, wherein the transmission grating is adapted move in a direction; and
    a reflective element comprising two reflective surfaces and a diffraction grating on another surface, the reflective element configured to diffract the sub-beams from the transmission grating and to return the sub-beams to the transmission grating, wherein the reflective element is substantially stationary relative to the sensor head and the transmission grating selectively recombines the sub-beams to form the measurement beams and returns the measurement beams to the sensor head.

2. A measurement displacement system as claimed in claim 1, wherein the reflective element is a roof reflector comprising a cross-section of a right isosceles triangle.

3. A measurement displacement system as claimed in claim 1, further comprising a prism comprising the transmission grating, wherein the transmission grating comprises substantially uniform line spacing.

4. A measurement displacement system as claimed in claim 3, wherein the prism comprises a cross-section of a right triangle.

5. A measurement displacement system as claimed in claim 1, wherein the measurement beams comprise a first measurement beam and a second measurement beam.

6. A measurement displacement system as claimed in claim 5, wherein the first measurement beam comprises only first order diffraction components.

7. A measurement displacement system as claimed in claim 5, wherein the second measurement beam comprises both zeroth order and first order diffraction components.

8. A measurement displacement system as claimed in claim 5, further comprising detector arrays configured to measure a phase difference for the first and second measurement beams, wherein an x-displacement is calculated as:

$$x = \frac{N1p}{4};$$

and a z-displacement is calculated as:

$$z = \frac{1}{4}(2N2 - N1)p\cos(\alpha)\cot\left(\frac{\alpha}{2}\right)$$

wherein p is a pitch of the transmission grating, α is an angle of incidence, N1 is the number of fringes of the first measurement sub-beam and N2 is the number of fringes of the second measurement sub-beam.

9. A measurement displacement system as claimed in claim 1, wherein the measurement beams comprise a first measurement beam and a second measurement beam and the first measurement beam comprises a phase difference only due to a grating phase difference of components of the first measurement beam.

10. A measurement displacement system as claimed in claim 7, wherein the second measurement beam comprises a phase difference only due to a difference in optical path length of components of the second measurement beam.

11. A method of measuring a displacement, the method comprising:
    directing an optical input beam toward a movable object;
    at the movable object: diffracting the optical input beam into sub-beams comprising more than one diffraction order, and reflecting the sub-beams toward a stationary reflective element, the reflective element comprising two reflective surfaces and a diffraction grating on another surface;

at the reflective element: diffracting the sub-beams from the transmission grating, and returning the sub-beams to the movable object;

at the movable object selectively recombining the sub-beams to form measurement channels; and directing the measurement beams toward a sensor head.

12. A method as claimed in claim 11, wherein the measurement beams comprise a first measurement beam comprising diffraction components and a second measurement beam comprising diffraction components.

13. A method as claimed in claim 12, wherein the diffraction components of the first measurement beam comprise only first order diffraction components.

14. A method as claimed in claim 12, wherein the diffraction components of the second measurement beam comprise zeroth and first order diffraction components.

15. A measurement displacement system, comprising:

sensor head configured to transmit input optical beams and to receive a first measurement beam and a second measurement beam, wherein the second measurement beam comprises both zeroth order diffraction components and first order diffraction components;

a transmission grating configured to diffract the input optical beams into sub-beams comprising more than one diffraction order, wherein the transmission grating is adapted move in a direction; and a reflective element configured to diffract the sub-beams from the transmission grating and to return the sub-beams to the transmission grating, wherein the sensor head is substantially stationary and the transmission grating selectively recombines the sub-beams to form the measurement beams and returns the measurement beams to the sensor head.

16. A measurement displacement system as claimed in claim 15, wherein the first measurement beam comprises only first order diffraction components.

17. A measurement displacement system as claimed in claim 15, wherein the reflective element is a roof reflector having a cross-section of a right isosceles triangle.

18. A measurement displacement system as claimed in claim 15, wherein the reflective element comprises two reflective surfaces and a diffraction grating on another surface, the reflective element.

19. A measurement displacement system as claimed in claim 15, further comprising a prism comprising the transmission grating, wherein the transmission grating comprises substantially uniform line spacing.

* * * * *